US012789591B2

(12) United States Patent
Ams

(10) Patent No.: US 12,789,591 B2
(45) Date of Patent: Nov. 10, 2026

(54) VEHICLE HAVING HVAC SYSTEM THAT IS CONFIGURED TO FILTER AND SANITIZE AIR FLOW

(71) Applicant: FCA US LLC, Auburn Hills, MI (US)

(72) Inventor: Paul Ams, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 97 days.

(21) Appl. No.: 18/812,162

(22) Filed: Aug. 22, 2024

(65) Prior Publication Data

US 2026/0054549 A1 Feb. 26, 2026

(51) Int. Cl.
*B60H 1/32* (2006.01)
*B60H 1/00* (2006.01)

(52) U.S. Cl.
CPC ....... *B60H 1/3233* (2013.01); *B60H 1/00028* (2013.01); *B60H 1/00042* (2013.01)

(58) Field of Classification Search
CPC .............. B60H 1/3233; B60H 1/00028; B60H 1/00042; B60H 3/022; F24F 6/105; F24F 6/025; F25D 21/14
See application file for complete search history.

(56) References Cited

U.S. PATENT DOCUMENTS 5,341,653 A * 8/1994 Tippmann ............. F25D 11/003 62/288
2004/0182093 A1* 9/2004 Tanaka ...................... F24F 8/24 62/78
2010/0230503 A1* 9/2010 Nakaguro .............. B60H 3/022 236/44 A
2017/0203323 A1* 7/2017 Gschwind ........... B05B 17/0615
2018/0326811 A1* 11/2018 Chelian .............. B60H 1/00771

FOREIGN PATENT DOCUMENTS

DE 202018105060 U1 * 9/2018 ......... B60H 1/32331
FR 3003808 A1 * 10/2014 ......... B05B 17/0615
JP H0790690 * 10/1995
JP 2002181371 A * 6/2002
WO 2023-163943 A1 8/2023

OTHER PUBLICATIONS

DE-202018105060-U1 Translation (Year: 2018).*
FR-3003808-A1 Translation (Year: 2013).*
JPH0790690 Translation (Year: 1995).*
JP-2002181371-A Translation (Year: 2002).*

* cited by examiner

*Primary Examiner* — David J Teitelbaum
(74) *Attorney, Agent, or Firm* — Jeremy J. Klobucar

(57) ABSTRACT

A HVAC system for a vehicle having a passenger cabin. The HVAC system may include a duct system, an evaporator positioned in the duct system between a first air inlet and an air outlet for exchanging heat with air present in the duct system before it reaches the air outlet; a reservoir containing water; a heating element for heating the water contained in the reservoir and generating steam; and a steam introduction duct that connects the reservoir to the duct system at a location upstream from the evaporator, wherein the steam generated by the heating element sanitizes the air in the duct system before it reaches the air outlet, and the evaporator is configured to condense the steam in the duct system into droplets of water that entrap particulate matter present in the air in the duct system, and drain from the duct system back into the reservoir.

18 Claims, 2 Drawing Sheets

VEHICLE HAVING HVAC SYSTEM THAT IS CONFIGURED TO FILTER AND SANITIZE AIR FLOW

FIELD

Figure 1:
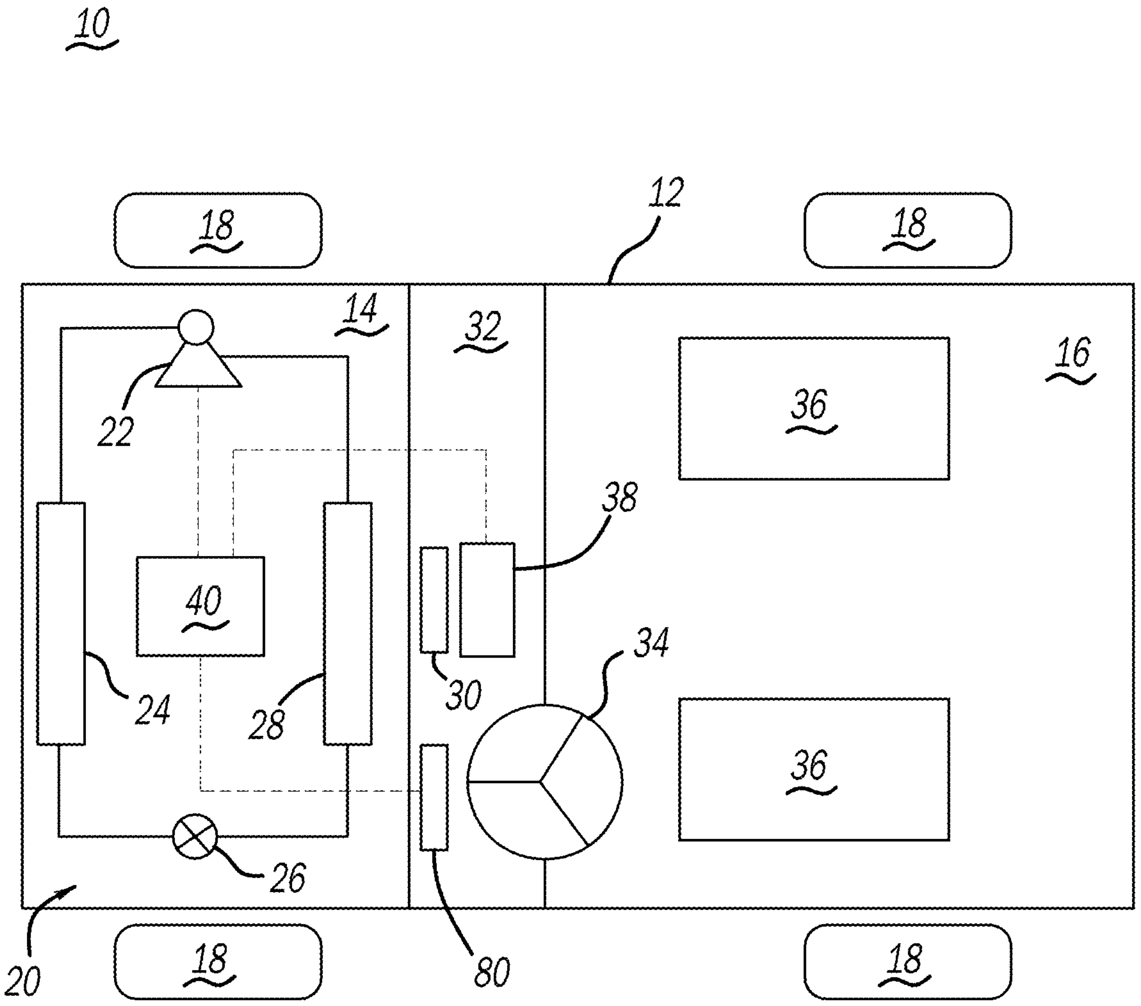

The present disclosure relates to a vehicle having a HVAC system that is configured to filter and sanitize air flow.

BACKGROUND

This section provides background information related to the present disclosure which is not necessarily prior art.

Vehicle HVAC systems may include an air filter for filtering air before it is introduced into the passenger cabin. While these filters may be effective at removing particulate matter (e.g., dust, dirt, etc.) having a relatively large particle size (e.g., 0.4 microns and greater), these filters may not be as effective at removing particulate matter having a smaller particle size. In addition, these filters are not effective at removing microbes from the air before it enters the passenger cabin.

SUMMARY

This section provides a general summary of the disclosure, and is not a comprehensive disclosure of its full scope or all of its features.

According to a first aspect of the present disclosure, there is provided a vehicle that includes a duct system having a first air inlet, and an air outlet in communication with a passenger cabin of the vehicle; a heat exchanger positioned in the duct system between the first air inlet and the air outlet for exchanging heat with air present in the duct system before it reaches the air outlet; a reservoir containing water; a heating element for heating the water contained in the reservoir and generating steam; and a steam introduction duct that connects the reservoir to the duct system at a location upstream from the heat exchanger, wherein the steam generated by the heating element sanitizes the air in the duct system before it reaches the air outlet, and the heat exchanger is configured to condense the steam in the duct system into droplets of water that entrap particulate matter present in the air in the duct system, and drain from the duct system back into the reservoir.

According to the first aspect, the vehicle may also include a filter provided in the duct system downstream from the inlet and upstream from the location where the steam introduction duct is connected to the duct system.

According to the first aspect, the filter is configured to remove particulate matter from the air having a particle size greater than 0.3 microns, and the particulate matter that is entrapped by the droplets of water have a particle size of 0.3 microns or less.

According to the first aspect, the first air inlet is configured to receive exterior ambient air.

According to the first aspect, the vehicle may also include a second air inlet located in the passenger cabin of the vehicle that is configured to receive interior air from the passenger cabin.

According to the first aspect, the vehicle may also include a valve that in a first position permits the exterior ambient air to enter the duct system while preventing the interior air from entering the duct system, and in a second position permits the interior air to enter the duct system while preventing the exterior ambient air from entering the duct system.

According to the first aspect, the vehicle may also include a controller in communication with the heating element.

According to the first aspect, the vehicle may also include an air quality sensor positioned in the duct system and in communication with the controller, the air quality sensor being configured to generate signals indicative of air quality and communicate the signals indicative of air quality to the controller.

According to the first aspect, based on the signals indicative of air quality received from the air quality sensor, the controller is configured to activate the heating element to generate the steam.

According to the first aspect, the vehicle may also include a switch in the passenger cabin that is in communication with the controller, wherein actuation of the switch communicates an instruction to the controller to activate the heating element to generate the steam.

According to the first aspect, the reservoir includes a drain line that is configured to permit excess water in the reservoir to drain.

According to a second aspect of the present disclosure, there is provided a heating, ventilation, and air conditioning (HVAC) system for a vehicle having a passenger cabin. The HVAC system may include a duct system having a first air inlet, and an air outlet in communication with the passenger cabin of the vehicle; an evaporator positioned in the duct system between the first air inlet and the air outlet for exchanging heat with air present in the duct system before it reaches the air outlet; a reservoir containing water; a heating element for heating the water contained in the reservoir and generating steam; and a steam introduction duct that connects the reservoir to the duct system at a location upstream from the evaporator, wherein the steam generated by the heating element sanitizes the air in the duct system before it reaches the air outlet, and the evaporator is configured to condense the steam in the duct system into droplets of water that entrap particulate matter present in the air in the duct system, and drain from the duct system back into the reservoir.

According to the second aspect, the HVAC system may also include a filter provided in the duct system downstream from the inlet and upstream from the location where the steam introduction duct is connected to the duct system.

According to the second aspect, the filter is configured to remove particulate matter from the air having a particle size greater than 0.3 microns, and the particulate matter that is entrapped by the droplets of water have a particle size of 0.3 microns or less.

According to the second aspect, the HVAC system may also include a second air inlet located in the passenger cabin of the vehicle that is configured to receive interior air from the passenger cabin, wherein the first air inlet is configured to receive exterior ambient air.

According to the second aspect, the HVAC system may also include a valve that in a first position permits the exterior ambient air to enter the duct system while preventing the interior air from entering the duct system, and in a second position permits the interior air to enter the duct system while preventing the exterior ambient air from entering the duct system.

According to the second aspect, the HVAC system may also include a controller in communication with the heating element According to the second aspect, the HVAC system may also include an air quality sensor positioned in the duct system and in communication with the controller, wherein the air quality sensor is configured to generate signals indicative of air quality and communicate the signals indicative of air quality to the controller, and based on the signals indicative of air quality received from the air quality sensor, the controller is configured to activate the heating element to generate the steam.

According to the second aspect, the HVAC system may also include a switch in the passenger cabin that is in communication with the controller, wherein actuation of the switch communicates an instruction to the controller to activate the heating element to generate the steam.

According to the second aspect, the reservoir includes a drain line that is configured to permit excess water in the reservoir to drain.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
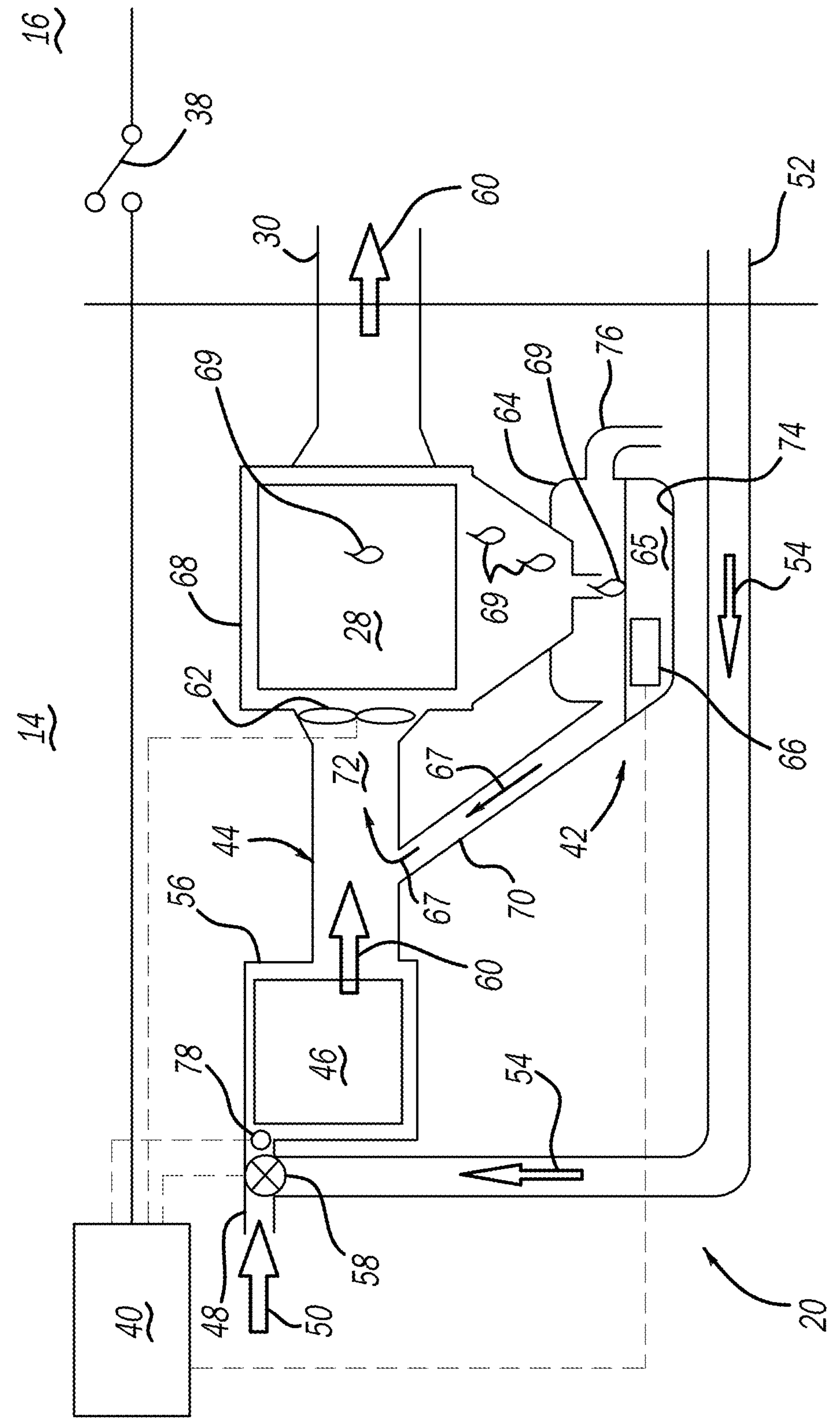

FIG. 1 schematically illustrates a vehicle according to a principle of the present disclosure having an HVAC system according to a principle of the present disclosure; and FIG. 2 is a schematic representation of a portion of the HVAC system that is configured to filter and sanitize air flow according to a principle of the present disclosure.

Corresponding reference numerals indicate corresponding parts throughout the several views of the drawings.

DETAILED DESCRIPTION

Example embodiments will now be described more fully with reference to the accompanying drawings. Th example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

FIG. 1 schematically illustrates a vehicle 10 according to a principle of the present disclosure. Vehicle 10 includes a body 12 that defines an engine compartment 14 and a passenger cabin 16. Engine compartment may house a propulsion system (not shown) that provides power to at least one wheel 18 of vehicle 10. Example propulsion systems (not shown) may include internal combustion engines, electrically-powered drive systems, and hybrid drive systems. Engine compartment 14 may also house a heating, ventilation, and air conditioning (HVAC) system 20 that includes a compressor 22, a first heat exchanger (i.e., condenser) 24, an expansion device 26 such as an expansion valve or capillary tube, and a second heat exchanger 28 (i.e., evaporator). While not shown in FIG. 1, it should be understood that HVAC system 20 may include additional components such as a dryer, accumulator, fan, and other components that are known to one skilled in the art.

HVAC system 20 is configured to provide heated and/or cooled air to passenger cabin 16 through at least one vent 30, as is known in the art. Vent 30 may be provided in a vehicle dashboard 32, or located at another location within passenger cabin 16. Passenger cabin 16 may also include a steering wheel 34 and at least one (in the illustrated embodiment, two) passenger seat 36. Passenger cabin 16 may also include a switch 38 that communicates with a controller 40 of vehicle 10. When actuated by an occupant of vehicle 10, switch 38 is configured to communicate an instruction to controller 40 to actuate a sanitation assembly 42 (FIG. 2) of HVAC system 20. While sanitation assembly 42 may be occupant-activated, it should also be understood that sanitation assembly 42 may also be actuated by controller 40 without input from an occupant, as will be described in more detail later.

Referring to FIG. 2, sanitation assembly 42 may be used to disinfect air and reduce particulate matter that has entered a duct system 44 of HVAC system 20 by producing steam and intermixing the steam with the air that is passing through duct system 44 at a location upstream of evaporator 28. Duct system 44 is configured to receive air from the ambient environment as well as receive air from passenger cabin 16. In either case, the air that has entered duct system 44 passes through a filter 46 that is designed to at least reduce an amount of particulate matter that may be present in the air. Filter 46, however, is generally not sufficient to remove particulate matter having a particle size of 0.3 microns or less, nor is filter 46 configured to disinfect the air (e.g., neutralize microbes) before it reaches passenger cabin 16. The manner in which sanitation assembly 42 can further reduce the amount of particulate matter (i.e., particulate matter having a particle size of 0.3 microns or less) and disinfect the air will be described in more detail below.

Duct system 44 includes a first inlet 48 that is configured to receive exterior ambient air 50 and a second inlet 52 that is configured to receive and recycle interior air 54 that is present in passenger cabin 16. First and second inlets 48 and 52 are connected to a filter housing 56 that houses filter 46. A valve 58 (which may be, for example, a flapper valve) that may be in communication with and operated by controller 40 may be present between first and second inlets 48, 52 at a location upstream from filter housing 56 to control whether duct system 44 is receiving either the exterior ambient air 50 or the interior air 54 that is present in passenger cabin 16. That is, if an occupant desires to, for example, cool passenger cabin 16 using exterior ambient air 50, valve 58 may be in a position that seals second inlet 52 to prevent the interior air 54 from reaching filter housing 56. Alternatively, if an occupant desires to recycle the interior air 54, valve 58 can be operated by controller 40 to seal first inlet 48 and prevent the exterior air 50 from reaching filter housing 56.

Regardless of the type of air that is permitted to enter filter housing 56, the air will pass through filter 46 to remove particulate matter (e.g., dust, dirt, smog, and the like) before the air passes through evaporator 28 to exchange heat with a coolant (not shown) passing through coils (not shown) of the evaporator 28. After the filtered air 60 exchanges heat with evaporator 28, the filtered air 60 is blown through vent 30 using a blower 62 located between filter 46 and evaporator 28. While blower 62 is illustrated as being immediately upstream from evaporator 28, it should be understood that blower 62 can be located immediately downstream from filter 46. As noted above, filter 46 is generally not configured to filter particulate matter having a particle size that is smaller than 0.3 microns nor is filter 46 configured to disinfect either the exterior air 50 or the interior air 54 from passenger cabin 16. The use of sanitation assembly 42, however, can assist in removing particulate matter from the filtered air 60 having a particle size less than 0.3 microns that filter 46 failed to remove as well as disinfect the filtered air 60.

As shown in FIG. 2, sanitation assembly 42 includes a reservoir 64 that contains water 65 and a heating element 66. Reservoir 64 is attached to a casing 68 that holds evaporator 28 and that is connected to duct system 44. In the event that an occupant of the vehicle 10 desires further filtered and disinfected air, the occupant may actuate switch 38 located within passenger cabin 16 to send an instruction to controller 40 to activate heating element 66. Once heating element 66 is activated, heating element 66 will begin to heat the water 65 until steam 67 is generated, which may be superheated to a temperature greater than the boiling point of water (i.e., greater than 100 degrees C.). The steam 67 that is generated using heating element 66 will then enter a steam-introduction duct 70 that connects reservoir 64 with a mixing chamber 72 of duct system 44 that is positioned between filter housing 56 and casing 68 that holds evaporator 28. Blower 62 can be located between filter 46 and steam-introduction duct 70 to enhance mixing of the filtered air 60 and the steam 67.

As the steam 67 enters mixing chamber 72 and intermixes with the filtered air 60, the steam 67 will disinfect the air 60 because the steam 67 may be heated to a temperature that can eliminate any microbes that may be present in the filtered air 60. In addition, after the mixture of steam 67 and filtered air 60 enters casing 68 to exchange heat with evaporator 28, it should be understood that the steam 67 will cool and begin to condense to form water droplets 69 on surfaces of evaporator 28. More importantly, it should be understood that any particulate matter remaining in the filtered air 60 can serve as seeds for forming water droplets 69 as well. As the water droplets 69 grow in size, the mass of the water droplets 69 that have formed on evaporator 28 and the water droplets 69 that have formed around the particulate matter will cause the water droplets 69 to be pulled by gravity and fall in a direction toward reservoir 64, where the water can collect and be reused to generate the steam 67. In addition, the particulate matter that was collected by the condensing droplets 69 of water can settle at a bottom 74 of reservoir 64. Thus, by creating steam 67 that can be intermixed with the filtered air 60 in mixing chamber 72, sanitation assembly 42 can effectively disinfect the filtered air 60 and further remove particulate matter from the filtered air 60 before blower 62 blows the filtered air 60 into passenger cabin 16.

While reservoir 64 can be pre-charged with a volume of water 65 that is sufficient to generate steam 67, it should be understood that during warm weather or humid conditions, an increased amount of water vapor may be present in either the exterior ambient air 50 or the air 54 present in passenger cabin 16. Thus, even when sanitation assembly 42 is not operating, condensation may develop in casing 68 that can drain into reservoir 64. Put another way, a volume of water that is in addition to the pre-charged volume can collect in reservoir 64 when ambient conditions are humid. If too great a volume of water is present in reservoir 64, it can drain from a drain line 76 attached to reservoir 64.

While sanitation assembly 42 has been described above as being an occupant-activated system, it should be understood that sanitation system 42 can be operated automatically by controller 40 when certain environmental conditions are determined to be present. In this regard, it should be understood that HVAC system 20 may include an air-quality sensor 78 located in duct system 44 at a location upstream from filter 46 that is configured to generate signals indicative of air quality. That is, air-quality sensor 78 can generate, for example, signals indicative of an amount of particulate matter present in the air and/or generate signals indicative of other pollutants. When such a signal is generated by air quality sensor 78 and communicated to controller 40, controller 40 can decide whether to activate heating device 66 and generate steam 67 in an effort to remove the particulate matter and/or pollutants in the manner described above.

In another alternative embodiment, vehicle 10 may include a global positioning system (GPS) 80 that is in communication with controller 40, and that can monitor a geographic location of vehicle 10. As GPS 80 monitors the geographic location of vehicle 10, it can be determined whether vehicle 10 has entered a geographic region that has poor air quality. This is possible because, in addition to being able to communicate with satellites to receive information associated with the geographic location of vehicle 10, GPS 80 may also be configured to receive information directed to air quality data.

Upon receipt of the information directed to air quality data where vehicle 10 is travelling, a communication may be sent to controller 40 to initiate sanitation assembly 42. That is, controller 40 can instruct valve 58 to move to a position that prevents exterior air 50 from entering duct system 44 and only permits interior air 54 to enter duct system 44. In addition, heating element 66 may be activated to generate the steam 67 and form droplets 69 around any particulate matter that may have already entered duct system 44 along with the exterior air 50 prior to valve 58 being instructed to prevent the exterior air 50 from entering duct system 44. After GPS 80 determines that the vehicle 10 has left the geographic location having poor air quality, controller 40 may then instruct valve 58 to move to a position that permits exterior air 50 to enter duct system 44 and cease operation of heating element 66.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle comprising:

a duct system having a first air inlet, and an air outlet in communication with a passenger cabin of the vehicle;

a heat exchanger positioned in the duct system between the first air inlet and the air outlet for exchanging heat with air present in the duct system before the air present in the duct system reaches the air outlet;

a reservoir containing water;

a heater element for heating the water contained in the reservoir and generating steam; and a steam introduction duct that connects the reservoir to the duct system at a location upstream from the heat exchanger, a filter provided in the duct system downstream from the first air inlet and upstream from the location where the steam introduction duct is connected to the duct system to remove particulate matter from the air present in the duct system;

wherein the steam generated by the heating element sanitizes the air in the duct system before the air in the duct system reaches the heat exchanger and the air outlet, and the heat exchanger is configured to condense the steam in the duct system into droplets of water that entrap remaining particulate matter present in the air in the duct system, and drain from the duct system back into the reservoir.

2. The vehicle according to claim 1, wherein the filter is configured to remove particulate matter from the air having a particle size greater than 0.3 microns, and the particulate matter that is entrapped by the droplets of water have a particle size of 0.3 microns or less.

3. The vehicle according to claim 1, wherein the first air inlet is configured to receive exterior ambient air.

4. The vehicle according to claim 3, further comprising a second air inlet located in the passenger cabin of the vehicle that is configured to receive interior air from the passenger cabin.

5. The vehicle according to claim 4, further comprising a valve that in a first position permits the exterior ambient air to enter the duct system while preventing the interior air from entering the duct system, and in a second position permits the interior air to enter the duct system while preventing the exterior ambient air from entering the duct system.

6. The vehicle according to claim 1, further comprising a controller in communication with the heating element.

7. The vehicle according to claim 6, further comprising an air quality sensor positioned in the duct system and in communication with the controller, the air quality sensor being configured to generate signals indicative of air quality and communicate the signals indicative of air quality to the controller.

8. The vehicle according to claim 7, wherein based on the signals indicative of air quality received from the air quality sensor, the controller is configured to activate the heating element to generate the steam.

9. The vehicle according to claim 6, further comprising a switch in the passenger cabin that is in communication with the controller, wherein actuation of the switch communicates an instruction to the controller to activate the heating element to generate the steam.

10. The vehicle according to claim 6, further comprising a global positioning system (GPS) in communication with the controller, wherein the GPS is configured to determine a geographic location of the vehicle and receive air quality information regarding the geographic location that is communicated to the controller, and after receipt of the air quality information from the GPS, the controller is configured to determine whether to activate the heating element.

11. A heating, ventilation, and air conditioning (HVAC) system for a vehicle having a passenger cabin, comprising:

a duct system having a first air inlet, and an air outlet in communication with the passenger cabin of the vehicle;

an evaporator positioned in the duct system between the first air inlet and the air outlet for exchanging heat with air present in the duct system before the air present in the duct system reaches the air outlet;

a reservoir containing water;

a heater element positioned in the reservoir for heating the water contained in the reservoir and generating steam; and a steam introduction duct that connects the reservoir to the duct system at a location upstream from the evaporator, a filter provided in the duct system downstream from the inlet and upstream from the location where the steam introduction duct is connected to the duct system;

wherein the steam generated by the heating element sanitizes the air in the duct system before the air in the duct system reaches the heat exchanger and the air outlet, and the evaporator is configured to condense the steam in the duct system into droplets of water that entrap particulate matter present in the air in the duct system, and drain from the duct system back into the reservoir.

12. The HVAC system according to claim 11, wherein the filter is configured to remove particulate matter from the air having a particle size greater than 0.3 microns, and the particulate matter that is entrapped by the droplets of water have a particle size of 0.3 microns or less.

13. The HVAC system according to claim 11, further comprising a second air inlet located in the passenger cabin of the vehicle that is configured to receive interior air from the passenger cabin, wherein the first air inlet is configured to receive exterior ambient air.

14. The HVAC system according to claim 13, further comprising a valve that in a first position permits the exterior ambient air to enter the duct system while preventing the interior air from entering the duct system, and in a second position permits the interior air to enter the duct system while preventing the exterior ambient air from entering the duct system.

15. The HVAC system according to claim 11, further comprising a controller in communication with the heating element.

16. The HVAC system according to claim 15, further comprising an air quality sensor positioned in the duct system and in communication with the controller, wherein the air quality sensor is configured to generate signals indicative of air quality and communicate the signals indicative of air quality to the controller, and based on the signals indicative of air quality received from the air quality sensor, the controller is configured to activate the heating element to generate the steam.

17. The HVAC system according to claim 15, further comprising a switch in the passenger cabin that is in communication with the controller, wherein actuation of the switch communicates an instruction to the controller to activate the heating element to generate the steam.

18. The HVAC system according to claim 15, further comprising a global positioning system (GPS) in communication with the controller, wherein the GPS is configured to determine a geographic location of the vehicle and receive air quality information regarding the geographic location that is communicated to the controller, and after receipt of the air quality information from the GPS, the controller is configured to determine whether to activate the heating element.

* * * * *